(12) United States Patent
Radic et al.

(10) Patent No.: US 10,439,499 B2
(45) Date of Patent: Oct. 8, 2019

(54) SWITCH-MODE POWER SUPPLY CONTROLLER

(71) Applicant: Silanna Asia Pte Ltd, Singapore (SG)

(72) Inventors: Aleksandar Radic, Toronto (CA); Seyed-Behzad Mahdavikhah-Mehrabad, Toronto (CA)

(73) Assignee: Silanna Asia Pte Ltd, Singapore (SG)

( * ) Notice: Subject to any disclaimer, the term of this patent is extended or adjusted under 35 U.S.C. 154(b) by 0 days.

(21) Appl. No.: 16/020,496

(22) Filed: Jun. 27, 2018

(65) Prior Publication Data

US 2018/0316270 A1 Nov. 1, 2018

Related U.S. Application Data

(63) Continuation of application No. PCT/CA2017/051207, filed on Oct. 11, 2017.

(Continued)

(51) Int. Cl.
*H02M 3/335* (2006.01)
*G01R 15/18* (2006.01)
(Continued)

(52) U.S. Cl.
CPC ........ *H02M 3/33507* (2013.01); *G01R 15/18* (2013.01); *G01R 19/00* (2013.01); *H02M 2001/0022* (2013.01)

(58) Field of Classification Search
CPC .................................................. H02M 3/33507
See application file for complete search history.

(56) References Cited

U.S. PATENT DOCUMENTS 5,173,846 A * 12/1992 Smith ..................... H02M 1/44
 363/131
5,206,800 A *  4/1993 Smith ............... H02M 3/33576
 363/131

(Continued)

FOREIGN PATENT DOCUMENTS

| KR | 20130054212 A | 5/2013 |
| KR | 20130105537 A | 9/2013 |
| WO | 2017074305 A1 | 5/2017 |

OTHER PUBLICATIONS

International Search Report and Written Opinion dated Jan. 15, 2018 for PCT Patent Application No. PCT/CA2017/051207.

(Continued)

*Primary Examiner* — Manuel L Barbee
*Assistant Examiner* — Raymond L Nimox
(74) *Attorney, Agent, or Firm* — MLO, a professional corp.

(57) ABSTRACT

A switch-mode power supply controller controls a circuit that includes a flyback-based, switch-mode power supply in the context of an input voltage source, a USB Type-C PD controller and an output load. The switch-mode power supply controller may be configured to estimate input voltage based on a measured magnetizing inductance discharge time. Furthermore, the switch-mode power supply controller may be configured to estimate output voltage based on the measured magnetizing inductance discharge time and the estimated input voltage. Still further, the estimated voltages may be used by the switch-mode power supply controller to limit certain currents and optimize power efficiency. Even further, the estimated and measured value may be employed by the switch-mode power supply controller to estimate and indicate brownout conditions.

7 Claims, 10 Drawing Sheets

Related U.S. Application Data

(60) Provisional application No. 62/406,589, filed on Oct. 11, 2016.

(51) Int. Cl.
    *G01R 19/00* (2006.01)
    *H02M 1/00* (2006.01)

(56) References Cited

U.S. PATENT DOCUMENTS

| | | | | |
|---|---|---|---|---|
| 5,434,767 | A * | 7/1995 | Batarseh | H02M 1/4208 323/222 |
| 5,636,106 | A * | 6/1997 | Batarseh | H02M 1/4208 323/222 |
| 6,421,256 | B1 * | 7/2002 | Giannopoulos | H02M 1/12 363/20 |
| 7,876,085 | B2 | 1/2011 | Hung et al. | |
| 8,259,471 | B2 | 9/2012 | Li et al. | |
| 8,339,817 | B2 | 12/2012 | Halberstadt | |
| 8,659,915 | B2 | 2/2014 | Tsui | |
| 8,755,203 | B2 | 6/2014 | Li et al. | |
| 9,991,791 | B2 * | 6/2018 | Herfurth | H02M 3/157 |
| 10,224,828 | B1 | 3/2019 | Sigamani et al. | |
| 2008/0112193 | A1 * | 5/2008 | Yan | H02M 3/33515 363/21.08 |
| 2009/0296429 | A1 * | 12/2009 | Cook | H02M 1/34 363/40 |
| 2010/0026208 | A1 * | 2/2010 | Shteynberg | H05B 33/0815 315/297 |
| 2011/0031949 | A1 | 2/2011 | Zhang et al. | |
| 2011/0182089 | A1 * | 7/2011 | genannt Berghegger | H02M 3/33507 363/21.13 |
| 2012/0002449 | A1 | 1/2012 | Park et al. | |
| 2012/0039098 | A1 * | 2/2012 | Berghegger | H02M 3/33507 363/21.13 |
| 2013/0245854 | A1 | 9/2013 | Rinne et al. | |
| 2014/0112030 | A1 | 4/2014 | Fahlenkamp | |
| 2014/0268913 | A1 * | 9/2014 | Zheng | H02M 7/2176 363/21.13 |
| 2015/0103566 | A1 * | 4/2015 | Keogh | H02M 3/33507 363/21.12 |
| 2015/0155786 | A1 * | 6/2015 | Shen | H02M 1/32 363/15 |
| 2015/0229200 | A1 * | 8/2015 | Schwartz | H02M 3/3376 363/21.03 |
| 2015/0249389 | A1 * | 9/2015 | Cummings | H02M 3/335 363/21.12 |
| 2017/0085183 | A1 * | 3/2017 | Notsch | H02M 3/33507 |
| 2018/0269793 | A1 * | 9/2018 | Ahsanuzzaman | H02M 3/33523 |
| 2019/0058450 | A1 | 2/2019 | Jun et al. | |

OTHER PUBLICATIONS

International Search Report dated May 21, 2019 for PCT Patent Application No. PCT/IB2019/051092.

Notice of Allowance dated Jun. 19, 2019 for U.S. Appl. No. 16/269,931.

* cited by examiner

SWITCH-MODE POWER SUPPLY CONTROLLER

CROSS-REFERENCE TO RELATED APPLICATIONS

This application is a continuation of International Application No. PCT/CA2017/051207, filed Oct. 11, 2017, which claims priority to U.S. provisional Patent Application No. 62/406,589, filed Oct. 11, 2016, both of which are hereby incorporated herein by reference in their entirety.

BACKGROUND

Switch-mode power supplies (SMPSs) are important power management components in modern electronic devices. They provide, among other things, on-line power processing efficiency optimization, enabling longer battery life and decreased power losses. The reduced power losses allow for lower operating temperatures, smaller cooling solutions, reduced bill-of-material and/or decreased SMPS volume.

However, in order to implement reliable and universal on-line power processing efficiency optimizations, accurate, constrained, noise tolerant and smooth controller mode transitions may be required. The practical implementation of such a controller is usually achieved using expensive, power hungry and/or application-specific mixed-signal circuits and algorithms.

Additional difficulties with existing systems may be appreciated in view of the instant disclosure.

BRIEF DESCRIPTION OF THE FIGURES

One or more example embodiments will now be described, by way of example only, with reference to the attached figures, wherein.

These figures depict exemplary embodiments for illustrative purposes, and variations, alternative configurations; alternative components and modifications may be made to these exemplary figures.

DETAILED DESCRIPTION OF EXAMPLE EMBODIMENTS

Aspects of the present application relate to switch-mode power supplies and control of universal switch-mode power supplies. Further aspects relate to the type of switch-mode power supplies that utilize the known USB Type-C power delivery (USB-PD) protocol. Still further aspects relate to the type of high-efficiency switch-mode power supplies that utilize autonomous synchronous rectification.

In accordance with an aspect of the present application there is provided a method of estimating an input voltage for a switch-mode power supply. The method includes populating a lookup table correlating a plurality of magnetizing inductance discharge times with a plurality of input voltages for the switch-mode power supply, measuring a magnetizing inductance discharge time and locating, in the lookup table, an input voltage that is correlated to the magnetizing inductance discharge time, the correlated input voltage providing an estimate of the input voltage.

In accordance with an aspect of the present application there is provided a method of power efficiency optimization. The method includes generating a plurality of theoretical power processing efficiency curves for a plurality of combinations of input voltage, output voltage and minimum flyback cell switching device off-time, determining an average of a plurality of weighted power processing efficiency for the plurality of combinations of input voltage, output voltage and minimum flyback cell switching device off-time, for each unique pair of a plurality of unique pairs of input voltage and output voltage, selecting a particular flyback cell switching device off-time having a greatest average weighted efficiency, populating a two-dimensional lookup table with each particular flyback cell switching device off-time associated with a corresponding unique pair and during on-line operation with a given input voltage and a given output voltage, utilizing the two-dimensional lookup table to obtain a useful flyback cell switching device off-time.

Figure 1:
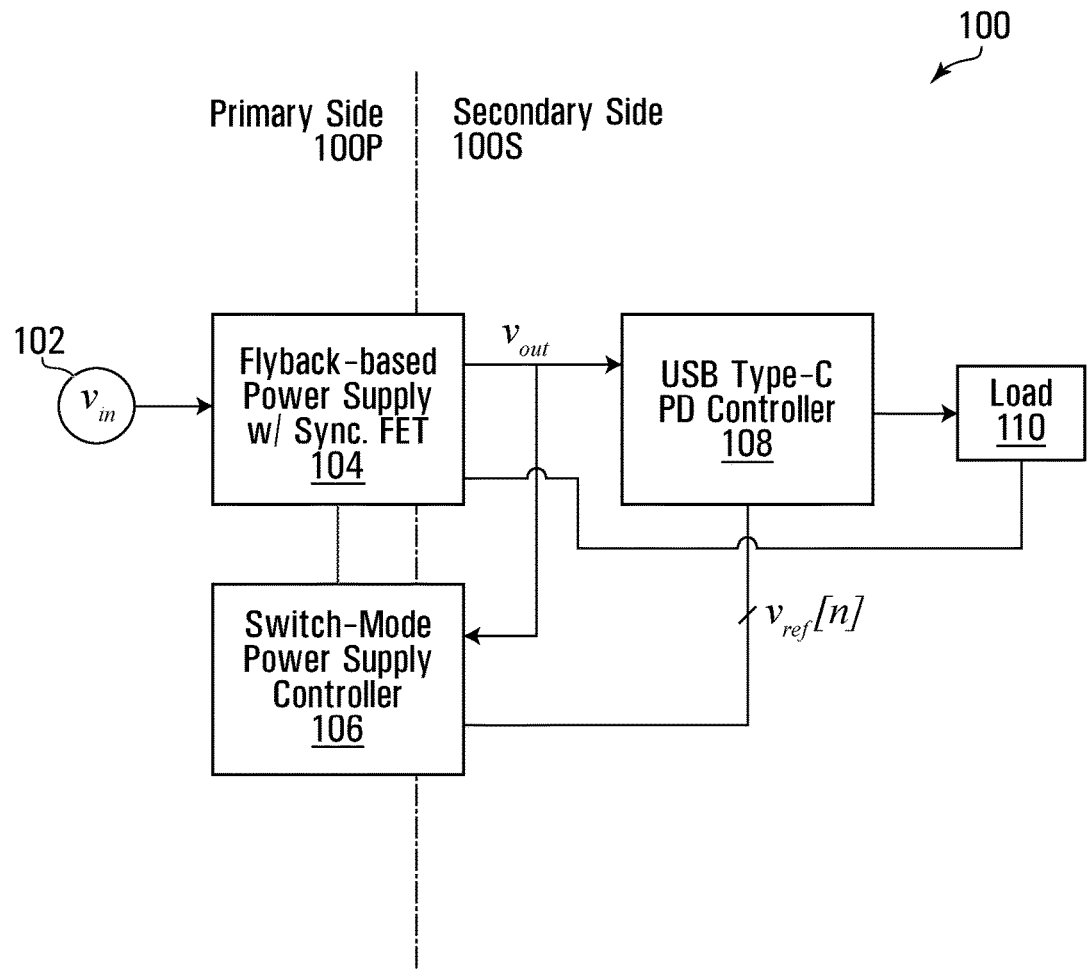
FIG. 1 schematically illustrates a flyback-based, switch-mode power supply in the context of an input voltage source, which may be alternating current (AC) or direct current (DC), a Universal Serial Bus (USB) Type-C power delivery (PD) controller, an output load and a switch-mode power supply controller.

FIG. 1 schematically illustrates a circuit 100 including a flyback-based, switch-mode power supply 104 in the context of an input voltage source 102, which may be AC or DC, a USB Type-C PD controller 108, an output load 110 and a switch-mode power supply controller 106. The circuit 100 of FIG. 1 has a primary side 100P and a secondary side 100S.

The switch-mode power supply controller 106 may be implemented with multi-mode operation capabilities for achieving on-line efficiency optimization over a wide range of input voltages, output voltages and output load currents. The switch-mode power supply controller 106 may, for example, be suited for USB-PD compliant flyback-based, switch-mode power supplies that may or may not utilize autonomous secondary-side synchronous rectification.

Figure 2:
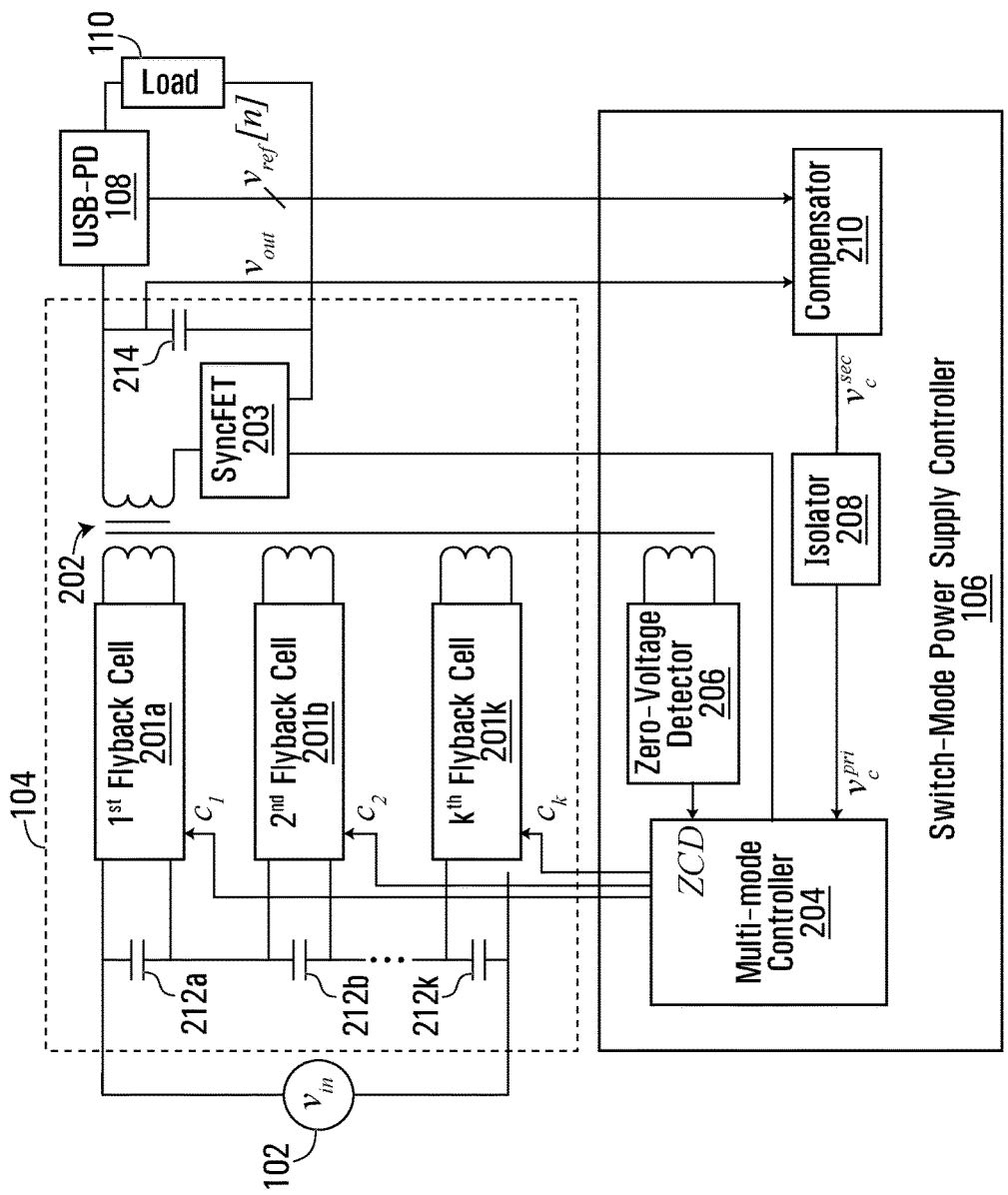
FIG. 2 schematically illustrates the flyback-based, switch-mode power supply of FIG. 1 with the input voltage source, a synchronous rectification module, a multi-mode controller with on-line power processing efficiency optimization and an output load.

FIG. 2 illustrates components of the flyback-based, switch-mode power supply 104 including a synchronous rectification module 203. The synchronous rectification module 203 may be controlled by the switch-mode power supply controller 106. In particular, the synchronous rectification module 203 may be controlled by an on-line, power processing, efficiency-optimization multi-mode controller 204. The flyback-based, switch-mode power supply 104 includes k flyback cells: a first flyback cell 201a; a second flyback cell 201b; and a $k^{th}$ flyback cell 201k. The k flyback cells may be referenced, individually or collectively, by the reference numeral 201. The flyback-based, switch-mode power supply 104 also includes k input capacitors: a first input capacitor 212a across the input of the first flyback cell 201a; a second input capacitor 212b across the input of the second flyback cell 201b; and a $k^{th}$ input capacitor 212k across the input of the $k^{th}$ flyback cell 201k.

Although not illustrated, a person of ordinary skill in the art of switch-mode power supplies will easily understand that each flyback cell 201 includes a switching device and a primary side winding for a flyback transformer 202. A distinct primary side winding is illustrated as associated with each flyback cell 201, but not labeled separately. The multi-mode controller 204 produces k control signals: $c_1$; $c_2$; ... and $c_k$. Each one of the k control signals is associated with a corresponding flyback cell switching device.

The flyback transformer 202 has a secondary side winding that is arranged in series with the synchronous rectification module 203. The series combination of the secondary side winding of the flyback transformer 202 and the synchronous rectification module 203 provides the output of the flyback-based, switch-mode power supply 104 across an output capacitor 214. A plurality, n, of reference voltages $v_{ref}$ output from the USB Type-C PD controller 108 are received at a feedback compensator network 210 along with the output $v_{out}$ of the flyback-based, switch-mode power supply 104.

The feedback compensator network 210 generates an internal error signal that is representative of a difference between the output voltage, $v_{out}$, at the output of the flyback-based, switch-mode power supply 104 and one reference voltage among the plurality of reference voltages output from the USB Type-C PD controller 108. The feedback compensator network 210 processes the difference through an internal proportional-integral (PI) or proportional-integral-differential (PID) compensator. The output from the feedback compensator network 210 is mirrored from the secondary side 100S to the primary side 100P through at an isolator 208. The isolator 208 provides a control signal voltage, $v_c^{pri}$, to the multi-mode controller 204.

When a flyback cell switching device is operated (e.g., closed), the associated primary winding may be characterized by a magnetizing inductance value $L_m$.

Figure 3:
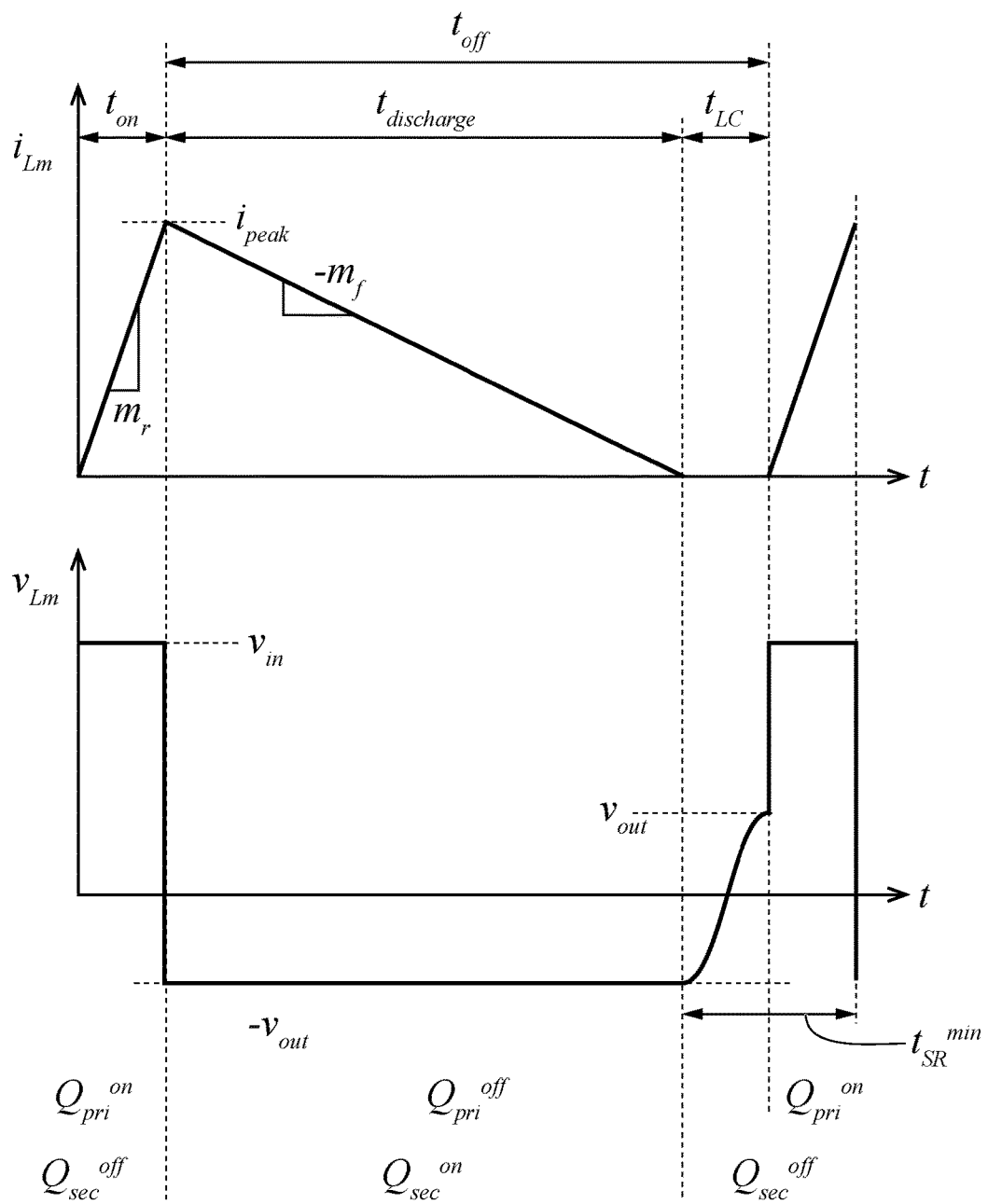
FIG. 3 illustrates graphs of exemplary curves showing evolution of a flyback magnetizing inductance current and a differential voltage during one switching period, where energy is transferred from a primary side to a secondary side.

FIG. 3 illustrates a waveform for a flyback magnetizing inductance current, $i_{Lm}$, and a waveform for a flyback magnetizing voltage, $v_{Lm}$, during a so-called discontinuous conduction mode (DCM) of operation, with so-called "first valley switching."

The multi-mode controller 204 may be implemented as a hardware efficient system that executes a method for estimating the input voltage, $v_{in}$, based on knowledge of several parameters. The parameters include an output voltage, $v_{out}$, a magnetizing inductance charging time, $t_{on}$, and a measurement of a magnetizing inductance discharging time, $t_{discharge}$. The relationship between these parameters for the flyback-based, switch-mode power supply 104, illustrated in FIG. 1 and FIG. 2, is given by the following Equations.

$$i_{peak} = m_r \cdot t_{on} = -m_f \cdot t_{discharge} \tag{1a}$$

$$\frac{m_r}{m_f} \cong \frac{v_{in}}{v_{out}} \tag{1b}$$

$$v_{in} = k \cdot v_{out} \cdot \frac{t_{discharge}}{t_{on}} = F_1(t_{discharge}) \tag{2}$$

In Equations (1a), (1b) and (2), the value $m_r$ is representative of a slope of the waveform for the magnetizing inductance current, $i_{Lm}$, expressed in Amperes (A) per second (s), i.e., "A/s," in the time period, $t_{on}$, during which the magnetizing inductance current is rising (see FIG. 3). The value $m_f$ is representative of a slope of the waveform for the magnetizing inductance current, $i_{Lm}$, expressed in A/s, in the time period, $t_{discharge}$, during which the magnetizing inductance current is falling (see FIG. 3). Equation (2) is representative of a manner of estimating the input voltage, $v_{in}$. Estimating the input voltage through the use of Equation (2) may be shown to be both hardware efficient and accurate. The input voltage estimation represented by Equation (2) may involve use of a one-dimensional ("1-D") lookup table in conjunction with measurement of the magnetizing inductance discharge time, $t_{discharge}$.

Figure 4:
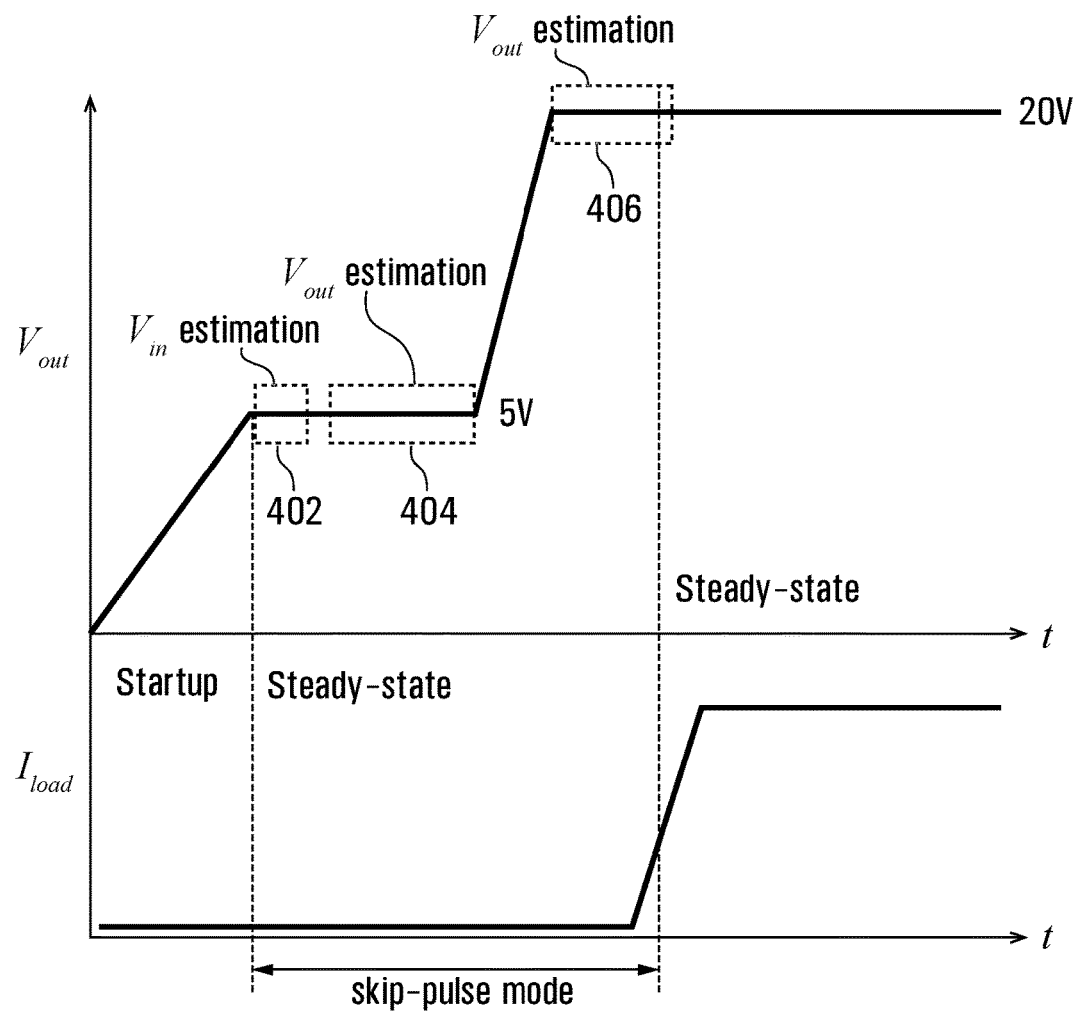
FIG. 4 illustrates a graph of exemplary curves showing evolution of output voltage and output load current during USB Type-C power delivery operation, including periods where the multi-mode controller estimates the input voltage and the output voltage.

For USB-PD compliance, the output voltage is to be regulated at 5V for a certain period of time shortly after start-up and during periods when no load is connected. Output voltage regulation is illustrated, in graph form, in FIG. 4. In FIG. 4, an output voltage waveform and an output load current waveform are illustrated for a generic, USB Type-C PD compliant switch-mode power supply during start-up and before, during and after an output voltage reference change. A point 402 when the input voltage, $V_{in}$, is estimated and two points 404, 406 when the output voltage, $V_{out}$, is estimated are highlighted with dashed boxes. During light-load modes of operation, the multi-mode controller 204 may operate with fixed flyback cell switching device on-time, $t_{on}^{min}$. That is, the multi-mode controller 204 may use the appropriate control signal, c, to turn on a switching device in one of the flyback cells 201 for a fixed period of time, $t_{on}^{min}$.

Figure 5:
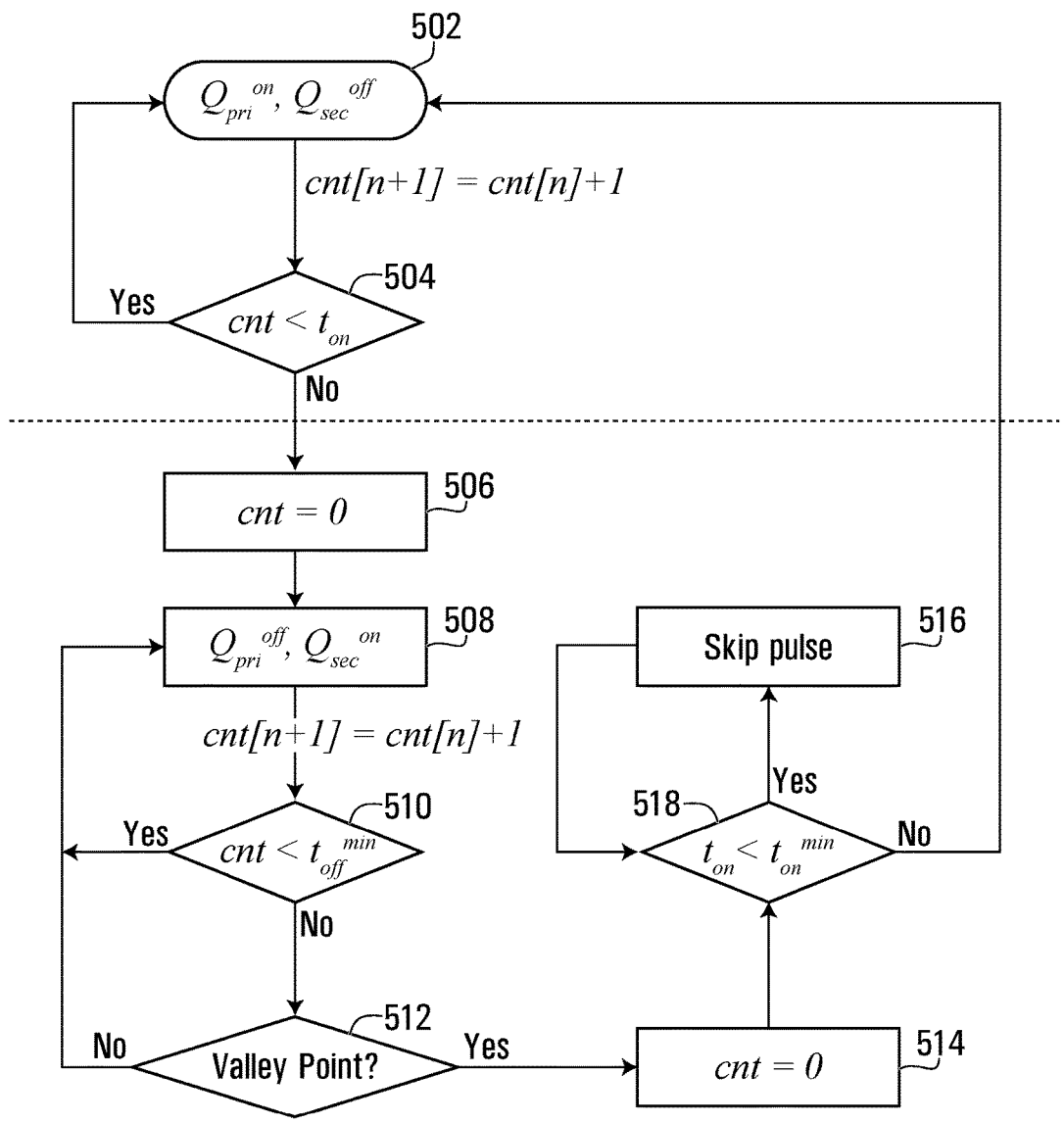
FIG. 5 illustrates a state diagram representative of various modes of operation of the multi-mode controller of FIG. 2 during one switching cycle.

FIG. 5 illustrates a state diagram representative of various modes of operation of the multi-mode controller 204. The various modes of operation include: a first mode of operation (mode 502) for supporting DCM; a second mode of operation (mode 508) for valley switching; and a skip-pulse mode of operation (mode 516).

As illustrated in FIG. 5, at start-up, the multi-mode controller 204 may be in the first mode of operation (mode 502). Subsequent to incrementing a count (cnt), a processor (not shown) of the multi-mode controller 204 may determine (step 504) whether the count is less than $t_{on}$. Upon determining that the count is less than $t_{on}$, the multi-mode controller 204 remains in the first mode of operation (mode 502). Upon determining that the count is greater than or equal to $t_{on}$, the processor of the multi-mode controller 204 re-initializes (step 506) the count to zero and the multi-mode controller 204 enters the second mode of operation (mode 508).

Subsequent to incrementing the count, the processor of the multi-mode controller 204 may determine (step 510) whether the count is less than $t_{off}^{min}$. Upon determining (step 510) that the count is less than $t_{off}^{min}$, the multi-mode controller 204 remains in the second mode of operation (mode 508). Upon determining (step 510) that the count is greater than or equal to $t_{off}^{min}$, the processor of the multi-mode controller 204 determines (step 512) whether a valley point has been reached in the flyback magnetizing voltage $v_{Lm}$. Upon determining (step 512) that a valley point has not been reached, the multi-mode controller 204 remains in the second mode of operation (mode 508).

Upon determining (step 512) whether a valley point has been reached, the multi-mode controller 204 re-initializes (step 514) the count to zero and determines (step 518) whether $t_{on}$ is less than $t_{on}^{min}$. Upon determining (step 518) that $t_{on}$ is less than $t_{on}^{min}$, the multi-mode controller 204 enters the third mode of operation (mode 516). Upon determining (step 518) that $t_{on}$ is greater than or equal to $t_{on}^{min}$, the multi-mode controller 204 re-enters the first mode of operation (mode 502).

Often, $v_{out}$ and $t_{on}$ are known and the discharge time, $t_{discharge}$, may be determined. In particular, the discharge time, $t_{discharge}$, may be determined by measurement using a zero-voltage detector 206 illustrated in FIG. 2. The minimum $t_{on}$ can be predetermined, based on multiple constraints, including: a resolution of $t_{on}$ that minimizes limit-cycle oscillations, which are worst at smallest $t_{on}$; a minimized synchronous controller off-time, which is relative to minimum $t_{on}$; and a power processing efficiency at ultra-light load.

The determination represented by Equation (2) may involve: tracking the parameter $t_{on}$ by measuring time between start-up and a first instance of light-load operation after start-up, e.g., detecting a fixed minimum $t_{on}$; measuring $t_{discharge}$ by measuring time between the first instance of light-load operation and a point at which the flyback magnetizing inductance current, $I_{Lm}$, falls to zero. The latter point may be detected using the zero-voltage detector 206 or a similar device; and determining the input voltage using Equation (2) coupled with the knowledge that the output voltage shortly after start-up is regulated tightly around 5V, as specified by USB-PD, and the knowledge that the number of the flyback cells 201 is fixed. The determining step of this method may be implemented using a hardware efficient one-dimensional lookup table, which may be represented by a function, "$F_1$."

Figure 6:
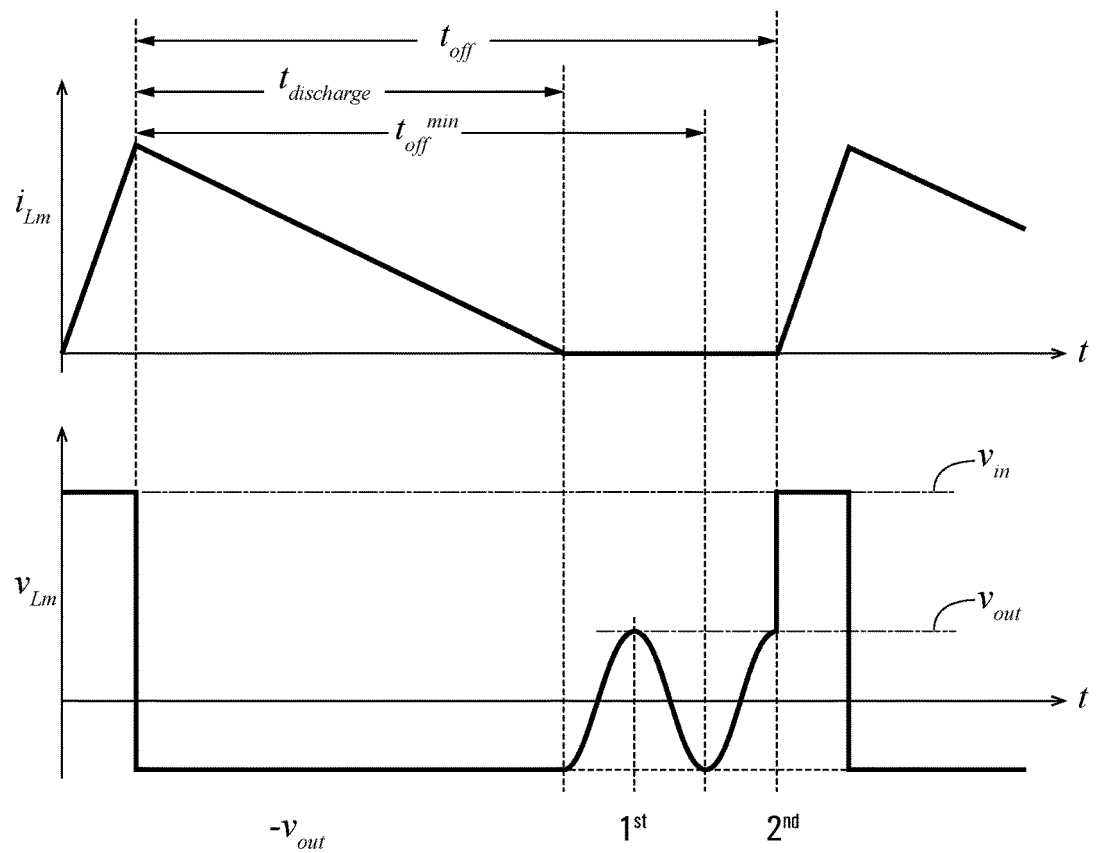
FIG. 6 illustrates a graph of exemplary curves showing evolution of a flyback magnetizing inductance current and a flyback magnetizing voltage $v_{L_m}$ for a medium output load with multiple valleys.

FIG. 6 illustrates a waveform for the flyback magnetizing inductance current, $i_{Lm}$, and a waveform for the flyback magnetizing voltage, $v_{Lm}$, during the second mode of operation (mode 508). The first valley point (mode 512), designated as $1^{st}$, occurs before the multi-mode controller 204 determines (step 510) whether the count is greater than or equal to $t_{off}^{min}$. Recall that the processor of the multi-mode controller 204 determines (step 512, FIG. 5) whether a valley point ($1^{st}$) has been reached in the flyback magnetizing voltage $v_{Lm}$. As such, the multi-mode controller 204 remains in the second mode of operation (mode 508) until the multi-mode controller 204 determines (step 512, FIG. 5) whether another valley point ($2^{nd}$) has been reached in the flyback magnetizing voltage $v_{Lm}$.

Figure 7:
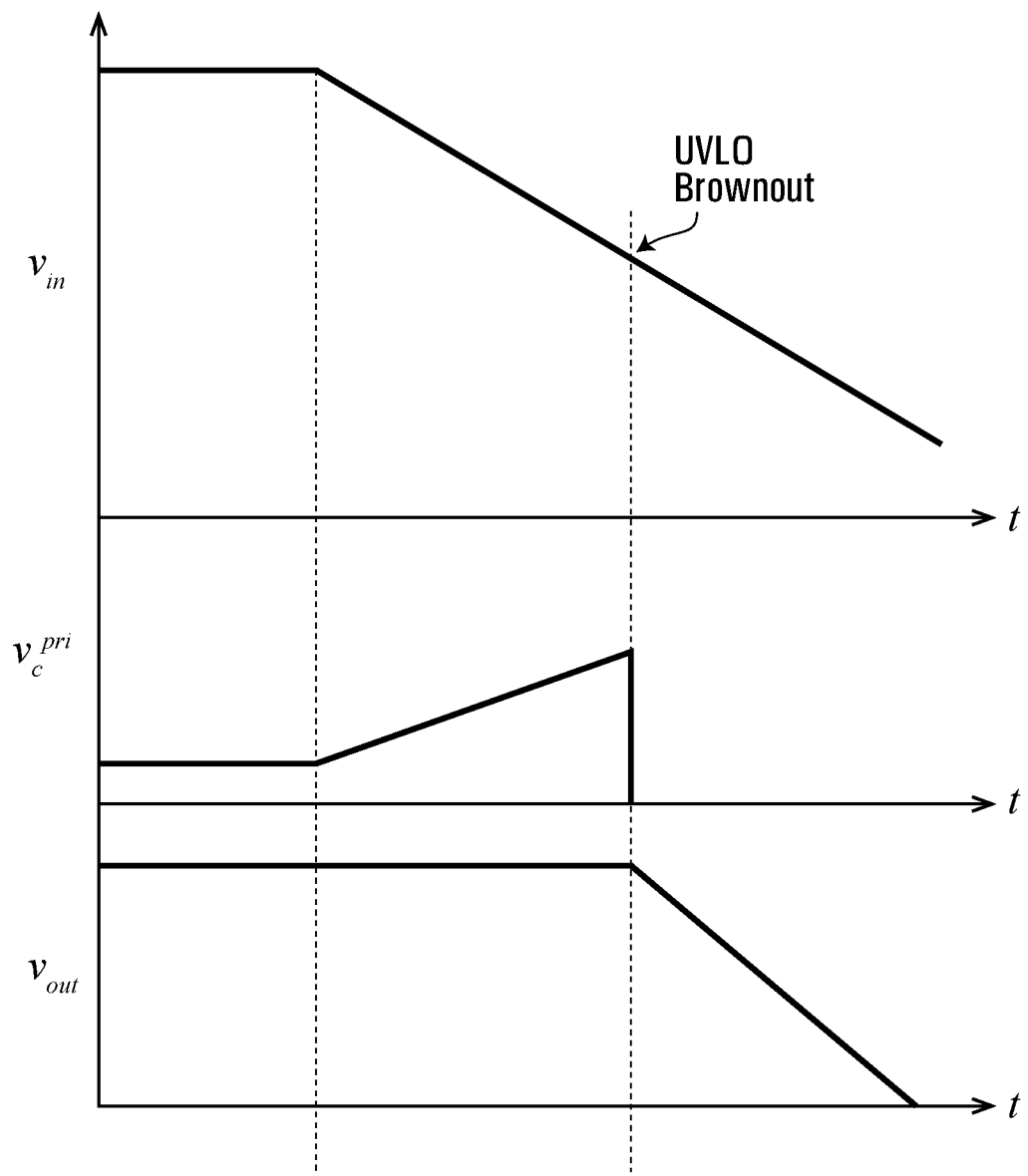
FIG. 7 illustrates graphs of graphs of exemplary curves showing evolution of an input voltage, an output voltage and a primary side control signal voltage preceding a brownout or under voltage lock out (UVLO) condition.

FIG. 7 illustrates a plot of input voltage, $v_{in}$, a plot of control signal voltage, $v_c^{pri}$, and a plot of output voltage, $v_{out}$, preceding and following a brownout condition, which may also be called an under-voltage lock-out (UVLO) condition. Upon review of FIG. 7, it may be seen that a decrease in the input voltage, $v_{in}$, is associated with an increase in control signal voltage, $v_c^{pri}$. In aspects of the present application, the previously discussed estimation of the input voltage based on Equation (2) may be expanded to cover detecting input voltage brownout conditions. In the example plot of input voltage, the example plot of output voltage and the example plot of control signal voltage before and during the brownout/UVLO, each of which are shown in FIG. 7, it may be noted that, prior to brownout/UVLO, the control signal voltage, $v_c^{pri}$, is increasing and that the output voltage is relatively constant. One consequence of a relatively constant output voltage is a relatively constant magnetizing inductance discharge time, $t_{discharge}$.

Eventually, the control signal voltage, $v_c^{pri}$, ceases to increase and drops down to zero the beginning of a brownout condition. Experimentally, it may be found at what value of the input voltage this drop occurs.

With the plots of FIG. 7 in mind, it is proposed herein to consider a method of detecting the beginning of a brownout condition. The method may be carried out by the multi-mode controller 204 and may involve determining that the input voltage is decreasing while the control signal voltage is increasing. Alternatively, the method may involve the multi-mode controller 204 determining that the input voltage is decreasing despite the magnetizing inductance discharge time, $t_{discharge}$, remaining nearly constant.

Determining that the input voltage is decreasing may, for example, involve repetitively obtaining estimations of the input voltage using an estimated or measured output voltage value, $v_{out}$, the number, e.g., k, of the flyback cells 201 and the ratio between $t_{discharge}$ and $t_{on}$ through the use of Equation (2), which is restated as follows:

$$v_{in} = k \cdot v_{out} \cdot \frac{t_{discharge}}{t_{on}} \quad (2)$$

A hardware efficient method of estimating the output voltage, $v_{out}$, employs an estimate of the input voltage estimate, $v_{in}$, determined using Equation (2), the number, e.g., k, of the flyback cells 201, the fixed magnetizing inductance charging time, $t_{on}$, and the measured discharging time, $t_{discharge}$.

Estimating the input voltage may involve use of information about the output load current being low, as shown in FIG. 4, during output voltage changes, when the mode of operation is the skip-pulse mode of operation, see mode 516 in FIG. 5.

As such, a discrete output voltage estimate found using Equation (3), which follows, may be implemented using a hardware efficient two-dimensional ("2-D") lookup table, which may be represented by a function, "$F_4$." Equation (3) may be shown to be hardware efficient and accurate for output voltage, $V_{out}$, estimation. Equation (3) may involve use of one 2-D lookup table, measurement of the magnetizing inductance discharge time, $t_{discharge}$, and estimation of the input voltage, $v_{in}$.

$$v_{out} = \frac{v_{in}}{k} \cdot \frac{t_{on}}{t_{discharge}} = F_4(v_{in}, t_{discharge}) \quad (3)$$

A method of detecting the beginning of a brownout condition may employ an estimate of the output voltage, $v_{out}$, obtained, say, via Equation (3), a detected magnetizing inductance discharge time, $t_{discharge}$, and a measurement of the flyback cell switching device on-time, $t_{on}$.

Figure 8:
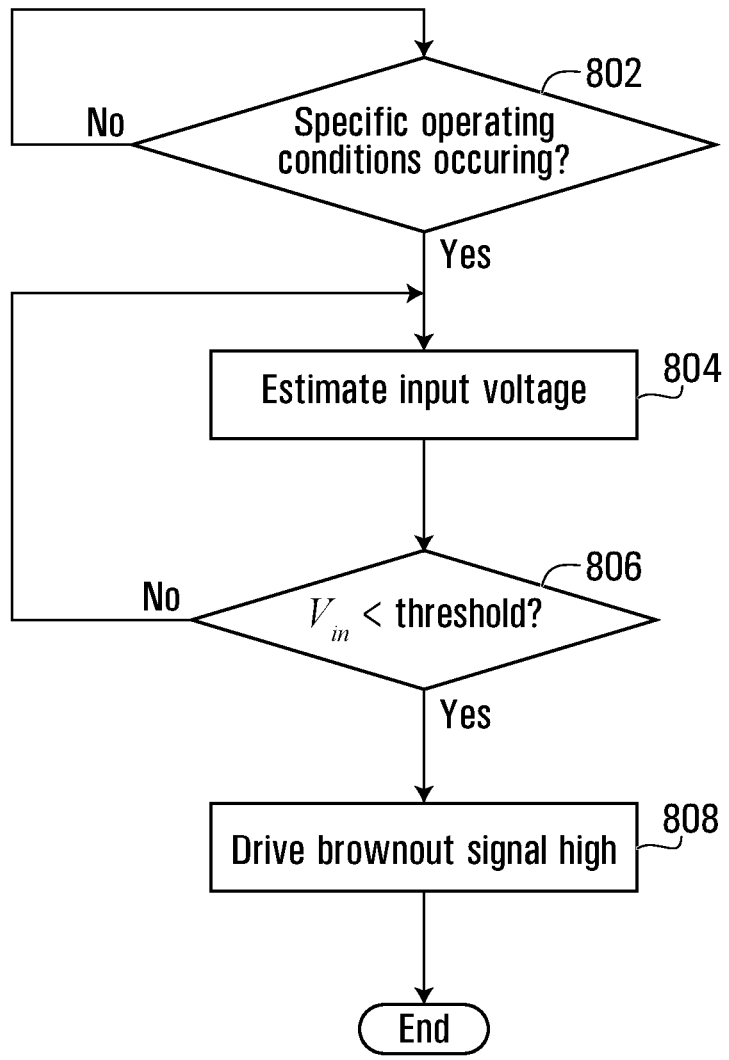
FIG. 8 illustrates exemplary steps in a method of detecting the beginning of a brownout condition.

Example steps in a method of detecting the beginning of a brownout condition are illustrated in FIG. 8. Upon determining (step 802) that the flyback-based, switch-mode power supply 104 is operating in a period wherein the input voltage, $v_{in}$, is decreasing and the control signal voltage, $v_c^{pri}$, is increasing while the discharge time, $t_{discharge}$, is relatively constant, the multi-mode controller 204 may estimate (step 804) the input voltage, $v_{in}$, using the parameters of Equation (2). After each iteration of estimating (step 804) the input voltage, the multi-mode controller 204 may determine (step 806) whether the estimated input voltage is greater than a predefined voltage value that has been determined, say, experimentally, to be representative of an input voltage at which a brownout condition begins. Responsive to determining (step 806) that the estimated input voltage is less than the predefined voltage value, the multi-mode controller 204 may drive (step 808) an UVLO/brownout signal high. Responsive to determining (step 806) that the estimated input voltage is not less than the predefined voltage value, the multi-mode controller 204 may again estimate (step 804) the input voltage.

Since the output voltage estimation occurs during low-load operation, an effect of input voltage variations due to AC 100-120 Hz ripple is minimized. Notably, the accuracy of the output voltage estimate may be limited by the regulation accuracy of the feedback compensator network 210.

Figure 9:
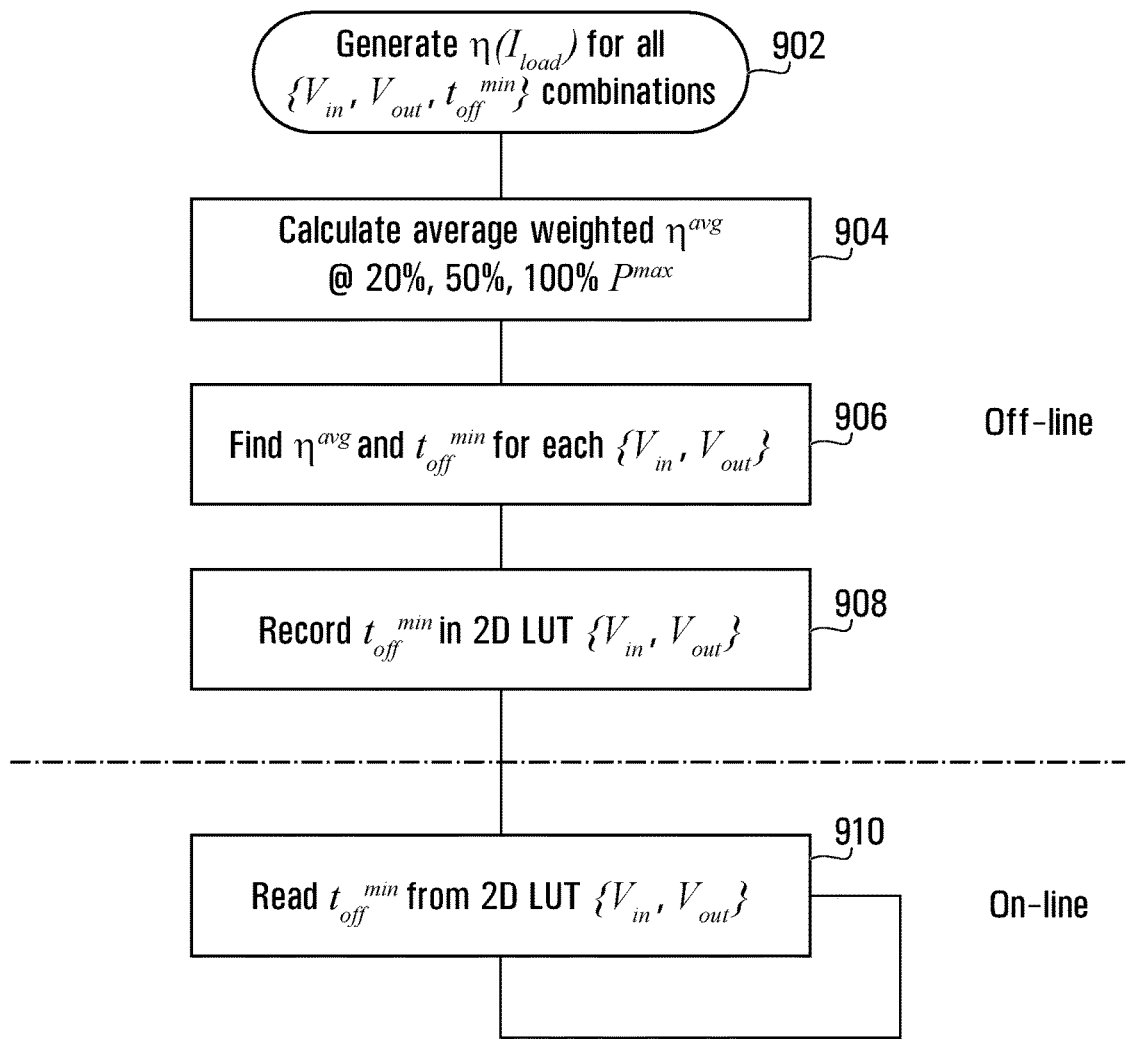
FIG. 9 illustrates exemplary steps in a method for generating a two-dimensional lookup table of minimum flyback cell switching device off-time, for on-line operation with average weighted power processing efficiency for a plurality of combinations of input voltage, output voltage and minimum flyback cell switching device off-time.

To maximize the average power processing efficiency, it may be seen as useful to select a minimum flyback cell switching device off-time, $t_{off}^{min}$. FIG. 9 illustrates example steps in a method of off-line generating and on-line employing of a lookup table correlating minimum flyback cell switching device off-time with pairs of input voltage and output voltage.

As an initial step (step 902), a processor executing a specific computer program generates a plurality of theoretical power processing efficiency curves. The plurality of curves includes individual curves, where each individual curve may be represented by a function "$\eta$" and be generated for one combination among a plurality of combinations. Each combination includes an input voltage, an output voltage and a minimum flyback cell switching device off-time, $t_{off}^{min}$. As should be clear to a person of skill in the art of switch-mode power supplies, the flyback cell switching device off-time is typically constrained. Minimum flyback cell switching device off-time may, for instance, be constrained by maximum switching losses. Maximum flyback cell switching device off-time may, for instance, be constrained by peak magnetizing inductance current, $i_{peak}$ (see FIG. 3). The generation of the theoretical power processing efficiency curves may be based, in part, on an assumption that the operation of the multi-mode controller 204 occurs in a manner consistent with the state diagram illustrated in FIG. 5.

The same processor may then determine (step 904) average weighted power processing efficiency, $\eta^{avg}$, for each combination of the plurality of combinations. For example, the processor may determine a power processing efficiency value at a 20% load level, a 50% load level and a 100% load level. These three power processing efficiency values may then be weighted. To find the average, the three weighted values may be summed and then divided by three.

The processor may then consider, for a unique pair of $v_{in}$ and $v_{out}$, which minimum flyback cell switching device off-time, $t_{off}^{min}$, is associated with the highest average weighted efficiency, $\eta^{avg}$. The processor may then select (step 906) the minimum off-time, $t_{off}^{min}$, that is associated with the highest average weighted efficiency. The processor may then insert (step 908) the selected $t_{off}^{min}$ for the unique pair into a lookup table, associated with the $v_{in}$ and the $v_{out}$ of the unique pair. The lookup table may be represented as a function, "$F_2$," as illustrated in Equation (4), which follows:

$$t_{off}^{min} = F_2(v_{out}, v_{in}). \qquad (4)$$

When useful in operation of the multi-mode controller 204, the processor of the multi-mode controller 204 may determine $t_{off}^{min}$ through reading the $t_{off}^{min}$ associated with a given $v_{in}$ and $v_{out}$ combination.

A maximum flyback cell switching device on-time, $t_{on}^{max}$, may be determined such that a peak magnetizing inductance current, remains below a saturation current of the flyback transformer 202. The maximum flyback cell switching device on-time may be based on an estimated input voltage, $v_{in}$, according to Equation (5), which follows:

$$t_{on}^{max} = i_{peak}^{max} \cdot \frac{L_m}{v_{in}} = F_3(v_{in}). \qquad (5)$$

Equation (5) may be simplified through the use of a lookup table represented by a function, "$F_3$."

Figure 10:
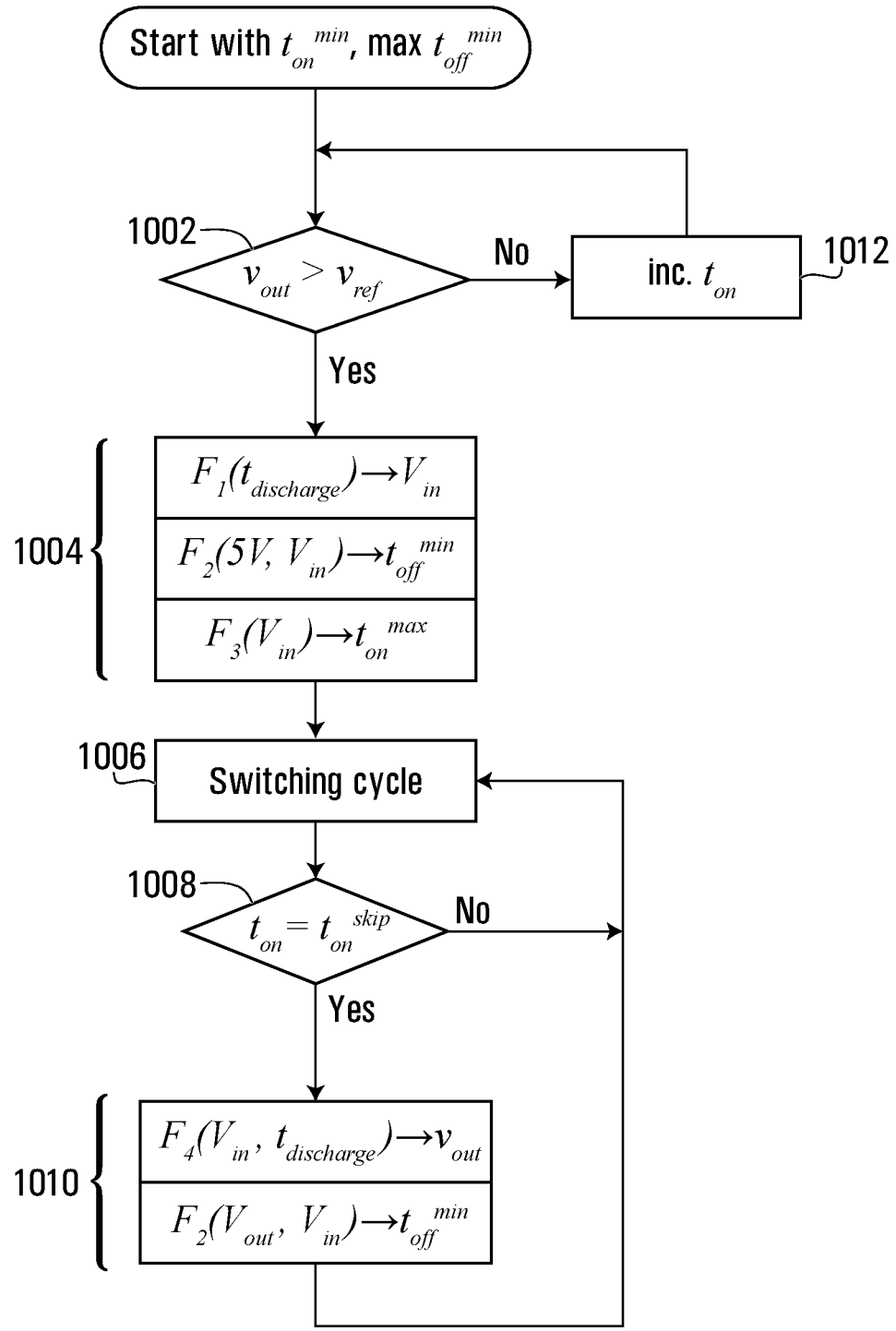
FIG. 10 illustrates exemplary steps in a method of operation of the multi-mode controller from initial start-up to normal operation, including input voltage estimation, output voltage estimation, minimum flyback cell switching device off-time selection and maximum on-time selection.

FIG. 10 illustrates a top-level flowchart, illustrating example steps in a method of estimating the input voltage, $v_{in}$, the output voltage, $v_{out}$, the maximum on-time, $t_{on}^{max}$, and the minimum off-time, $t_{off}^{min}$.

Initially, an assumption is made that $v_{out}$ is 5 V and that $v_{in}$ is maximized. Initial values for the maximum on-time, $t_{on}^{max}$, and the minimum off-time, $t_{off}^{min}$ may be pre-selected based on that assumption.

The processor of the multi-mode controller 204 determines (step 1002) whether the output voltage, $v_{out}$, is less than a reference voltage, $v_{ref}$. Upon determining (step 1002) that the output voltage, $v_{out}$, is not greater than a reference voltage, $v_{ref}$, the processor increments (step 1012) the flyback cell switching device on-time, $t_{on}$. The processor repeats the determining (step 1002) and the incrementing (step 1012) until the processor determines (step 1002) that the output voltage, $v_{out}$, is greater than the reference voltage, $v_{ref}$, the processor estimates (step 1004) $v_{in}$, $t_{on}^{max}$ and $t_{off}^{min}$. In some embodiments, responsive to determining that the maximum on-time $t_{on}^{max}$ is greater than or equal to the flyback cell switching device on-time $t_{on}$, the flyback cell switching device on-time $t_{on}$ is assigned to the maximum on-time $t_{on}^{max}$.

The processor may use (step 1004) Equation (2) to estimate $v_{in}$ based on $t_{discharge}$.

The processor may use (step 1004) Equation (4), with $v_{out}$ set to 5 V, to estimate $t_{off}^{min}$ based on the estimated $v_{in}$.

The processor may use (step 1004) Equation (5) to estimate $t_{on}^{max}$ based on the estimated $v_{in}$.

The processor may then implement (step 1006) a switching cycle.

The processor may then determine (step 1008) whether the skip-pulse mode of operation (mode 516) is enabled. Determining (step 1008) whether the skip-pulse mode of operation (mode 516) is enabled may, for example, involve determining that the flyback cell switching device on-time, $t_{on}$, has reached a flyback cell switching device on-time, $t_{on}^{skip}$, that is already associated with the skip-pulse mode of operation (mode 516).

Upon determining that the skip-pulse mode of operation (mode 516) is enabled, the processor estimates (step 1010), say, through the use of Equation (3), a new output voltage and uses the new output voltage, say, through the use of Equation (4), to find a new $t_{off}^{min}$. The processor then returns to implement (step 1006) another switching cycle. Similarly, upon determining that the skip-pulse mode of operation (mode 516) is not enabled, the processor returns to implement (step 1006) another switching cycle.

In a first aspect, there is provided hardware efficient and accurate input voltage estimation method, requiring only one 1-D lookup table and measurement of the magnetizing inductance discharge time. See Equation (2).

In a second aspect, there is provided hardware efficient and accurate output voltage estimation method, requiring only one 2-D lookup table, measurement of the magnetizing inductance discharge time and estimation of the input voltage (via the first aspect). See Equation (3).

In a further aspect, there is provided a method for on-line current-limit implementation via enforcement of a maximum on-time compromising of 1) input voltage estimation (via the first aspect), 2) lookup of an input voltage dependent maximum on-time from a 1-D lookup table (see Equation (5) and 3) comparison and, when applicable, limitation of issued primary-side switch on-time below the lookup table read maximum on-time value.

In a further aspect, there is provided a method for on-line power efficiency optimization via selection of the minimum primary side off-time/secondary side on-time comprising: 1) generation of power processing efficiency curves for all combinations of input voltage, output voltage and minimum primary side off-time/secondary side on-time for controller operation described in FIG. 3 using a computer program and model of switch-mode power supply. 2) Calculating average weighted efficiency (@ 20%, 50%, 100% maximum output load power) of all combinations. 3) Selecting off-time with highest average weighted efficiency. 4) Populating 2D lookup table with off-time for the specific input voltage and output voltage combination. 5) During on-line operation, utilizing appropriate lookup table off-time entry, in accordance with input voltage and output voltage combination and flowchart of FIG. 5.

In a further aspect, there is provided a method for robust brownout/UVLO estimation via output voltage estimation (via the second aspect), magnetizing inductance discharge time measurement and primary-side switch on-time knowledge. The method comprises of 1) detecting period when the input voltage is decreasing, that is time when the primary-side switch on-time is increasing/saturated and the discharge time is relatively constant, 2) estimating the input voltage using measured/estimated parameters listed previously and the first aspect, and 3) driving an UVLO/brownout signal high when the input voltage estimate is lower than a pre-defined voltage value.

The example embodiments, due to use of lookup tables, may be understood to provide hardware efficiency. The hardware efficiency can be considered with respect to at least some or all of: 1) the fact that 1D and 2D lookup tables can be compactly implemented on an ASIC or an FPGA (silicon area and/or lookup table memory space are negligible); 2) lookup tables are inherently low-power, in that lookup tables eliminate multiplication, addition, etc., which are known to be power-hungry, and lookup tables have low-propagation times, in that lookup tables can work with very fast operating frequency; 3) the lookup table size is minimized by the proposed utilization of known load and output voltage values during startup and after voltage changes, see the first mode of operation 502 (FIG. 5); and/or 4) the zero-voltage detector 206 (FIG. 2) can be implemented using a simple and cost-effective mixed-signal (integrated or discrete) circuit such as a comparator, resistive-divider and diode.

In some example embodiments, reference to a table herein can comprise suitable logical constructs such as a map, mapping, single parameter or multiple parameter computer variable, or any discrete value lookup method based on input variable(s).

In example embodiments, as appropriate, each illustrated block or module may represent software, hardware, or a combination of hardware and software. Further, some of the blocks or modules may be combined in other example embodiments, and more or less blocks or modules may be present in other example embodiments. Furthermore, some of the blocks or modules may be separated into a number of sub-blocks or sub-modules in other embodiments.

While some of the present embodiments are described in terms of methods, a person of ordinary skill in the art will understand that present embodiments are also directed to various apparatus such as a server apparatus including components for performing at least some of the aspects and features of the described methods, be it by way of hardware components, software or any combination of the two, or in any other manner. Moreover, an article of manufacture for use with the apparatus, such as a pre-recorded storage device or other similar non-transitory computer readable medium including program instructions recorded thereon, or a computer data signal carrying computer readable program instructions may direct an apparatus to facilitate the practice of the described methods. It is understood that such apparatus, articles of manufacture and computer data signals also come within the scope of the present example embodiments.

While some of the above examples have been described as occurring in a particular order, it will be appreciated to persons skilled in the art that some of the steps or processes may be performed in a different order provided that the result of the changed order of any given step will not prevent or impair the occurrence of subsequent steps. Furthermore, some of the steps described above may be removed or combined in other embodiments, and some of the steps described above may be separated into a number of sub-steps in other embodiments. Even further, some or all of the steps of the conversations may be repeated, as necessary. Elements described as methods or steps similarly apply to systems or subcomponents, and vice-versa.

In example embodiments, as applicable, the switch-mode power supply controller 106 can be implemented as or executed by, for example, one or more of the following systems: a Programmable Logic Controller (PLC); an Application-Specific Integrated Circuit (ASIC); a Field-Programmable Gate Array (FPGA); hardware; and/or software. The switch-mode power supply controller 106 can include a processor (not shown), which processor is configured to execute instructions stored in a computer readable medium such as a memory (not shown).

The term "computer readable medium," as used herein, includes any medium which can store instructions, program steps, or the like, for use by or execution by a computer or other computing device. The term "computer readable medium," as used herein, includes, but is not limited to: magnetic media, such as a diskette; a disk drive; a magnetic drum; a magneto-optical disk; a magnetic tape; a magnetic core memory, or the like; electronic storage, such as a random access memory (RAM) of any type including static RAM, dynamic RAM, synchronous dynamic RAM (SDRAM), a read-only memory (ROM), a programmableread-only memory of any type including PROM, EPROM, EEPROM, FLASH, EAROM, a so-called "solid state disk," other electronic storage of any type including a charge-coupled device (CCD), or magnetic bubble memory, a portable electronic data-carrying card of any type including COMPACT FLASH, SECURE DIGITAL (SD-CARD), MEMORY STICK, and the like; and optical media such as a Compact Disc (CD), Digital Versatile Disc (DVD) or BLU-RAY Disc.

Variations may be made to some example embodiments, which may include combinations and sub-combinations of any of the above. The various embodiments presented above are merely examples and are in no way meant to limit the scope of this disclosure. Variations of the example embodiments described herein will be apparent to persons of ordinary skill in the art, such variations being within the intended scope of the present disclosure. In particular, features from one or more of the above-described embodiments may be selected to create alternative embodiments comprised of a sub-combination of features which may not be explicitly described above. In addition, features from one or more of the above-described embodiments may be selected and combined to create alternative embodiments comprised of a combination of features which may not be explicitly described above. Features suitable for such combinations and sub-combinations would be readily apparent to persons skilled in the art upon review of the present disclosure as a whole. The subject matter described herein intends to cover and embrace all suitable changes in technology. Certain adaptations and modifications of the described embodiments can be made. Therefore, the above-discussed embodiments are considered to be illustrative and not restrictive.

What is claimed is:

1. A method comprising:
populating a first lookup table correlating a plurality of magnetizing inductance discharge times with a plurality of input voltages for a switch-mode power supply;
measuring a magnetizing inductance discharge time;
locating, in the first lookup table, an input voltage that is correlated to the magnetizing inductance discharge time, the correlated input voltage providing an estimate of the input voltage;
populating a second lookup table correlating a plurality of pairs with a plurality of output voltages for the switch-mode power supply, each pair among the plurality of pairs including a magnetizing inductance discharge time and an input voltage; and
locating, in the second lookup table, the output voltage as correlated to a particular pair, the pair including:
the magnetizing inductance discharge time; and
the estimate of the input voltage.

2. The method of claim 1, further comprising:
populating a third lookup table correlating a plurality of input voltages with a plurality of maximum on-time values for the switch-mode power supply;
locating, in the third lookup table, a maximum flyback cell switching device on-time value as correlated to the estimate of the input voltage;
comparing the maximum flyback cell switching device on-time value to a given flyback cell switching device on-time value; and
responsive to determining that the maximum flyback cell switching device on-time value is greater than or equal to the given flyback cell switching device on-time value, assigning, to the maximum flyback cell switching device on-time value, the given flyback cell switching device on-time value.

3. A method comprising:
populating a first lookup table correlating a plurality of magnetizing inductance discharge times with a plurality of input voltages for a switch-mode power supply;
measuring a magnetizing inductance discharge time;
locating, in the first lookup table, an input voltage that is correlated to the magnetizing inductance discharge time, the correlated input voltage providing an estimate of the input voltage;
repetitively determining a flyback cell control signal voltage;
repetitively obtaining additional magnetizing inductance discharge times;
repetitively locating, in the first lookup table, additional input voltages that are respectively correlated to the additional magnetizing inductance discharge times, the respective correlated input voltages providing respective additional estimates of the input voltage;
detecting a period during which the flyback cell switching control signal voltage is increasing and the magnetizing inductance discharge time is constant;
responsive to the detecting, comparing a respective estimate of the input voltage of the respective additional estimates of the input voltage corresponding to that period to a threshold voltage value; and
responsive to determining that the estimate of the respective input voltage estimate is lower than the threshold voltage value, driving a brownout signal high.

4. A method comprising:
generating a plurality of theoretical power processing efficiency curves for a plurality of combinations of input voltage, output voltage and minimum flyback cell switching device off-time;
determining an average of a plurality of weighted power processing efficiencies for the plurality of combinations of input voltage, output voltage and minimum flyback cell switching device off-time;
for each unique pair of a plurality of unique pairs of input voltage and output voltage, selecting a particular flyback cell switching device off-time having a greatest average weighted efficiency;
populating a two-dimensional lookup table with each particular flyback cell switching device off-time associated with a corresponding unique pair; and
during on-line operation with a given input voltage and a given output voltage, utilizing the two-dimensional lookup table to obtain a useful flyback cell switching device off-time.

5. The method of claim 4, further comprising:
determining a weighted power processing efficiency of the plurality of the weighted power processing efficiencies at 20% of a maximum output load power.

6. The method of claim 4, further comprising:
determining a weighted power processing efficiency of the plurality of the weighted power processing efficiencies at 50% of a maximum output load power.

7. The method of claim 4, further comprising:
determining a weighted power processing efficiency of the plurality of the weighted power processing efficiencies at 100% of a maximum output load power.

* * * * *